United States Patent [19]
Kingsley et al.

[11] Patent Number: 5,153,438
[45] Date of Patent: Oct. 6, 1992

[54] METHOD OF FORMING AN X-RAY IMAGING ARRAY AND THE ARRAY

[75] Inventors: Jack D. Kingsley; Robert F. Kwasnick, both of Schenectady, N.Y.

[73] Assignee: General Electric Company, Schenectady, N.Y.

[21] Appl. No.: 590,846

[22] Filed: Oct. 1, 1990

[51] Int. Cl.⁵ ............................................. H01L 21/70
[52] U.S. Cl. ......................... 250/370.09; 250/370.11; 437/924
[58] Field of Search ...................... 250/370.11, 370.09; 437/924

[56] References Cited

U.S. PATENT DOCUMENTS

| | | | |
|---|---|---|---|
| 3,507,734 | 4/1970 | Ruderman | 29/423 |
| 3,936,645 | 2/1976 | Iversen | 250/370.11 |
| 4,011,454 | 3/1977 | Lubowski et al. | 250/483.1 |
| 4,321,747 | 3/1982 | Takemura et al. | 437/2 |
| 4,906,850 | 3/1990 | Beerlage | 250/370.09 |

*Primary Examiner*—Constantine Hannaher
*Attorney, Agent, or Firm*—Donald S. Ingraham; James C. Davis, Jr.; Marvin Snyder

[57] ABSTRACT

An electronic x-ray imaging array is provided by combining a two-dimensional photosensitive array with a structured scintillator array, having a common array pattern and suitable alignment marks thereon, by bonding them face-to-face in alignment for direct coupling of x-ray luminescence from the scintillator array to the photosensitive array.

12 Claims, 3 Drawing Sheets

METHOD OF FORMING AN X-RAY IMAGING ARRAY AND THE ARRAY

RELATED APPLICATIONS

This application is relation to application Ser. No. 07/540,848, filed Oct. 1, 1990, entitled, "High Sensitivity, High Resolution, Solid State X-Ray Imaging Device", by J. D. Kingsley, which is incorporated herein reference in its entirety.

BACKGROUND OF THE INVENTION

1. Field of the Invention

The present invention relates to the field of x-ray imaging technology, and more particularly, to electronic readout of x-ray images.

2. Background Information

A variety of techniques are presently available for obtaining x-ray images. One common technique employs an x-ray absorbing phosphor screen which emits optical radiation which exposes photographic film held adjacent the phosphor screen. This technique offers the advantage of high resolution, but is not effective in real time because of the need to develop the photographic film to obtain a visible x-ray image.

Another alternative is an x-ray image intensifier tube in which x-rays are absorbed by a fluorescent screen which emits photons which are in turn absorbed in a layer of photoelectron emitting material which emits electrons which are then accelerated and focused on a phosphor screen to produce a higher intensity visible image. While this system operates in real time, it suffers from the disadvantage that it produces relatively low resolution images as a result of optical scattering, imperfect electron optics, loss of sharpness in the optics coupling the image intensifier to the camera and other effects. In addition, it is bulky, fragile, expensive and requires high voltage to operate.

U.S. Pat. No. 4,011,454 to Lubowski et al., entitled "Structure X-Ray Phosphor Screen" which is incorporated herein by reference in its entirety, discloses a modified x-ray image intensifier which provides increased resolution through the use of a structured scintillator material as the fluorescent screen. This structured scintillator screen is produced by a vacuum evaporation process in which CsI is evaporated from a source boat and deposited on a topographically structured surface to produce columnar scintillator elements. During the deposition, the structured surface is maintained at a temperature in the range of 50° C. to 150° C. The scintillator is then fired at 450° C. to 500° C. to compact the scintillator. The deposition process is then repeated to produce taller scintillator elements. This is followed by another firing at 450° C. to 500° C. to compact the scintillator. Following the final deposition, the scintillator is fired at 615° C.

In recent years, the art of electronic image processing has advanced rapidly. These advances have made computed tomography (CT) machines not only feasible, but very valuable medical diagnostic tools. However, such machines are substantially larger and more expensive than typical x-ray machines and are more suitable for obtaining images of slices through the body rather than a chest x-ray type of image of the body.

There is a need for high resolution x-ray imaging systems which have an improved modulation transfer function (MTF). The modulation transfer function is the output contrast divided by the input modulation and is a function of the spatial frequency of the modulation.

Semiconductor photosensitive imaging arrays are widely available today. They are used in television cameras, facsimile machines and a wide variety of other applications. These photosensitive imaging arrays can be made with a resolution of more than five line pairs per millimeter and thus are capable of providing high resolution conversion of visible light images to electronic form. Unfortunately for the x-ray art, such photosensitive imaging arrays do not respond to x-ray radiation and are much too small for effective use in x-ray imaging applications.

There is a need for increased resolution in real time x-ray imagery for x-ray images of the type typically provided on x-ray film and for electronic output of the x-ray image rather than optical output to facilitate electronic processing of the image data.

Related, incorporated by reference Application Ser. No. 07/590,848 provides such an array by growing a structured scintillator array on a photosensitive imaging array. While such a technique is effective, it can suffer from two disadvantages. First, the need to grow the scintillator structure on the photosensitive imaging array restricts the processing steps which can be used to fabricate the imaging array and to grow the scintillator array. Second, any errors which destroy the imaging array during fabrication or result in an unusable scintillator array increase the manufacturing costs because of the resulting loss of a working photosensitive imaging array or scintillator structure.

Accordingly, there is a need for increased flexibility in the provision of such x-ray imaging arrays.

OBJECTS OF THE INVENTION

Accordingly, a primary object of the present invention is to provide an electronic readout x-ray imaging system with high yield.

Another object of the present invention is to optimize the performance of a structured scintillator x-ray imaging array by permitting processing at temperatures exceeding about 250° C.

SUMMARY OF THE INVENTION

The above and other objects which will become apparent from the specification as a whole, including the drawings, are accomplished in accordance with the present invention by providing a structured scintillator array with the same array pattern as a photosensitive imaging array and bonding the two arrays together with the scintillator elements aligned with the photosensitive cells to provide electronic readout of the luminescent light generated by x-rays absorbed in the scintillator structure.

In accordance with one embodiment, the structure's scintillator array is grown on a growth plate which is provided with a topographical surface comprising a plurality of individual mesas which are spaced apart by intervening grooves. The mesas of this topographical surface are arranged with the same pattern of center-to-center spacing as the photosensitive cells of the photosensitive imaging array. A structured scintillator such as CsI is then grown on this growth plate in a manner which restricts growth of the CsI to being localized on individual mesas and not taking place in the region of the grooves between the mesas. The result is a structured, columnar array of CsI scintillator elements arranged in the same pattern as the photocells of the imaging array. Following growth and any additional thermal processing to activate the scintillator, the scintillator array is aligned with and bonded to the photosensitive array.

In order to facilitate accurate alignment, both the photosensitive array and the scintillator array growth plate preferably contain integrally formed optical registration marks which enable sufficiently accurate alignment between the photosensitive array and the scintillator array to ensure that each scintillator element is aligned with only one photosensitive cell.

Preferably, a reflecting surface is provided at the ends of the scintillator elements which are remote from the photosensitive imaging array and an optical coupling layer is disposed between the photosensitive imaging array and the scintillator array in order to maximize light transfer from individual scintillator elements to their associated photosensitive cells.

DETAILED DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION

Figure 1:
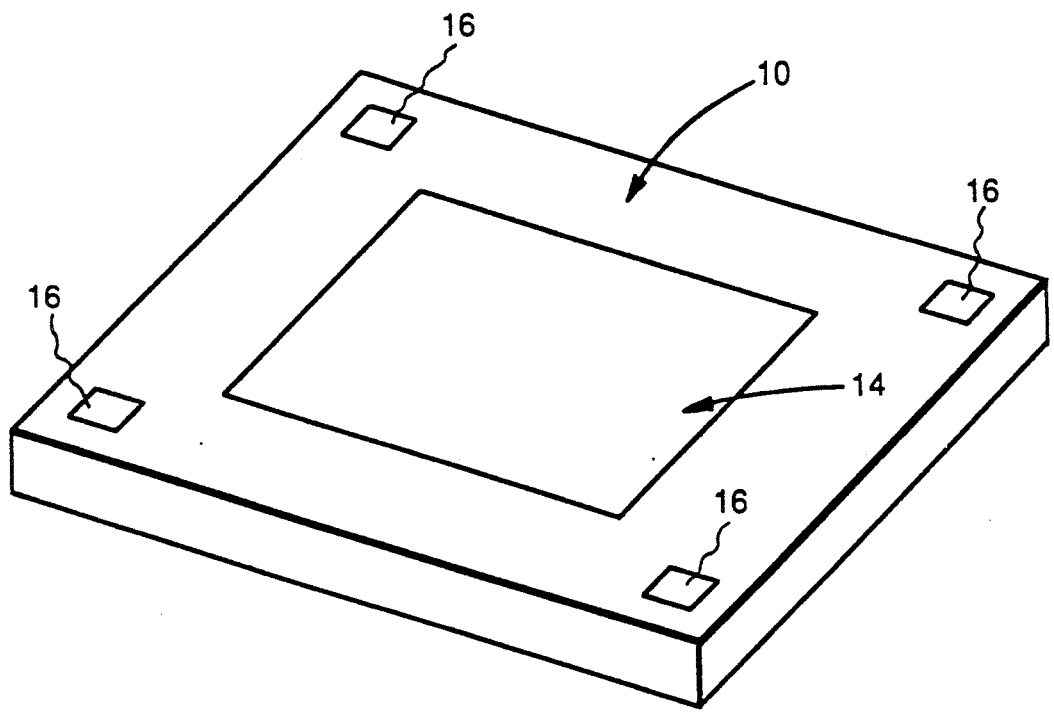
FIG. 1 is a stylized perspective view of a photosensitive imaging array.

A photosensitive array 10 is illustrated in stylized perspective view in FIG. 1. This array 10 comprises a central photosensitive region 14 containing many individual photosensitive cells which are laid out in a two-dimensional array. That array may preferably be rectangular, but other array configurations may be used. Outside that photosensitive section, the array 10 includes reference registration marks 16 whose positions are predetermined with respect to the array of photosensitive cells. These optical registration marks are preferably formed as an integral part of the process of forming the photosensitive imaging array. That is, they are included in the photolithographic masks which control the patterning of the various layers of the photosensitive imaging array so that they have a fixed, invariant positional relationship to the positions of all of the photosensitive cells of the photosensitive imaging array. This is to facilitate accurate alignment of the photosensitive imaging array in subsequent assembly steps. This photosensitive imaging array is preferably a thin film transistor readout photodiode array which is large enough for normal x-rays of the chest type. That is, in the range from about 20×20 cm to about 40×40 cm, with from about 1 to about 17 million photosensitive cells.

Figure 2:
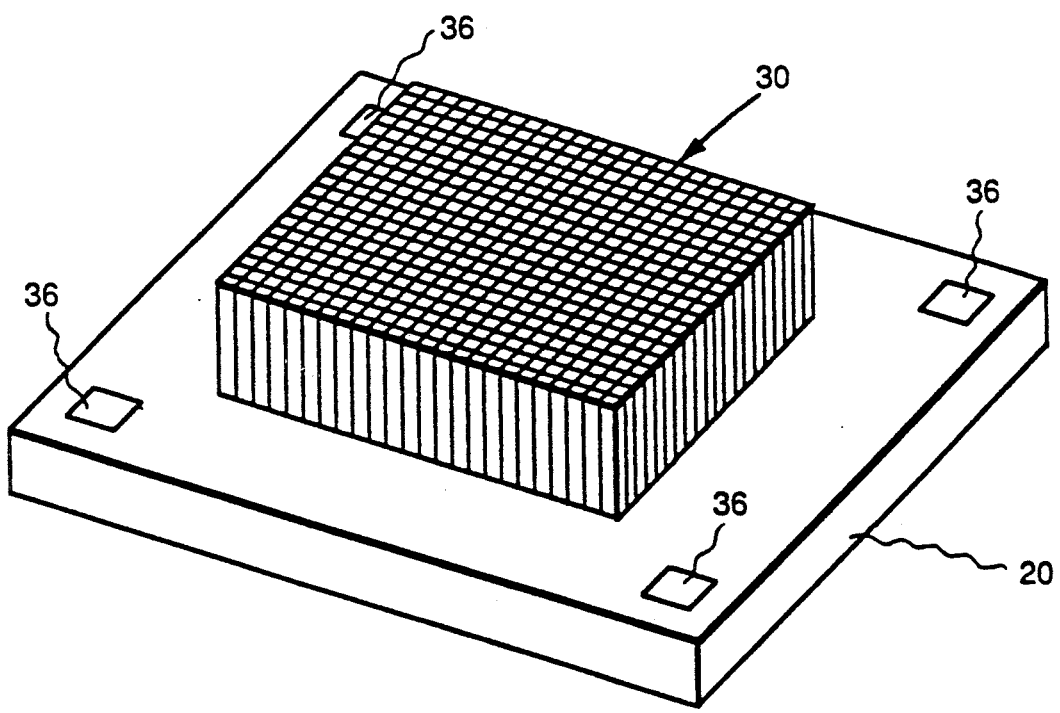
FIG. 2 is a stylized perspective view of a structured scintillator array.

In FIG. 2, a structured scintillator array is illustrated in a stylized perspective form. This scintillator array comprises a structured region of scintillator material 30 disposed on a support plate 20. This array is structured in the sense of being comprised of separate, individual elements which are disposed in a predetermined array pattern. The support plate 20 includes a plurality of registration marks 36 which are disposed outside the region occupied by the structured scintillator 30. These registration marks 36 are positioned in known, predetermined relation to the array structure of the scintillator 30. In order to ensure that these registration marks have exactly their intended positional relationship to the individual elements of the scintillator array, it is preferred that they be formed as an integral part of the process of forming this scintillator array.

The registration marks 16 on the photosensitive array and the registration marks 36 on the scintillator array are complementary in that they are configured and arranged so that when they are properly aligned, the individual array elements of the photosensitive array will be aligned with the individual scintillator elements of the scintillator array. A variety of alignment mark sets are well known to those familiar with microelectronic lithography. For example, the marks on the photosensitive imaging array substrate might be solid circles, squares, triangles, crosses, etc. and those on the scintillator substrate might be matching open circles or squares, etc. This alignment process however differs significantly from that in microelectronics because of the relatively wide (from a microelectronics point of view) spacing between the two substrates of from 300 to 450 microns or more which prevents microelectronic alignment systems from presenting both sets of alignment marks in focus at the same time. This problem may be overcome by using a highly collimated light source and a dual imaging system which separately focuses on the alignment marks on the two different substrates.

Figure 3:
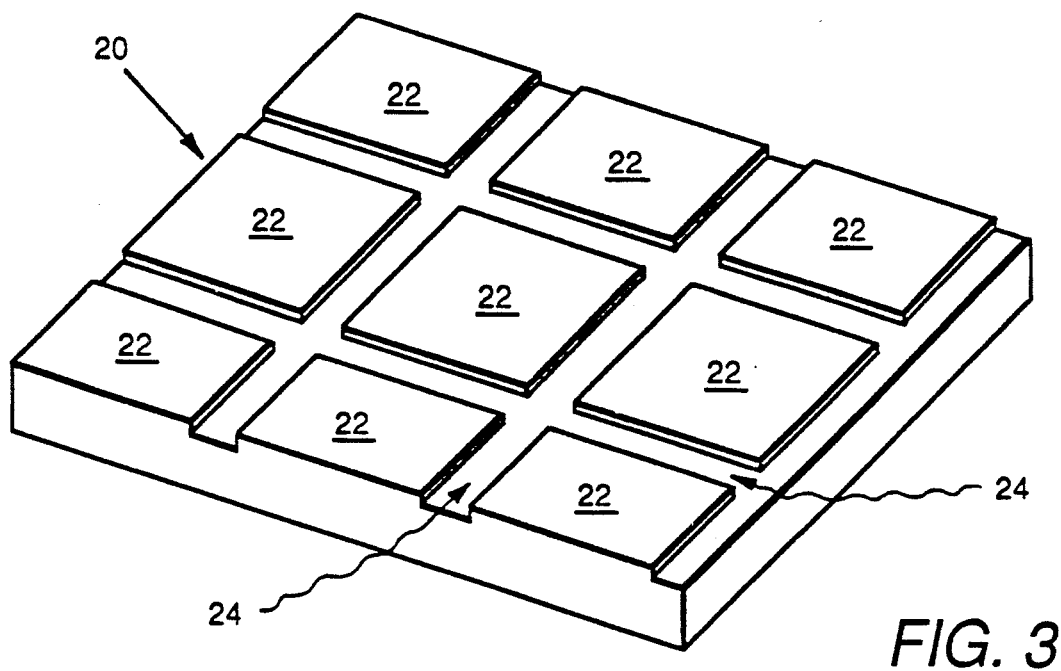
FIG. 3 is a detailed illustration a topographical surface on which the structured scintillator array may be formed.

In FIG. 3, a detailed section of a support plate 20 configured as a scintillator growth control plate is illustrated. The growth plate 20 comprises a plurality of mesas 22 which are separated by intervening grooves or depressions 24. This growth plate may be of any appropriate material, including aluminum, glass, fused quartz, Lexan ®, polyimide or other materials. If thermally induced stress in the final structure is a concern, it can be reduced by selecting substrates with similar thermal coefficients of expansion.

Figure 4:
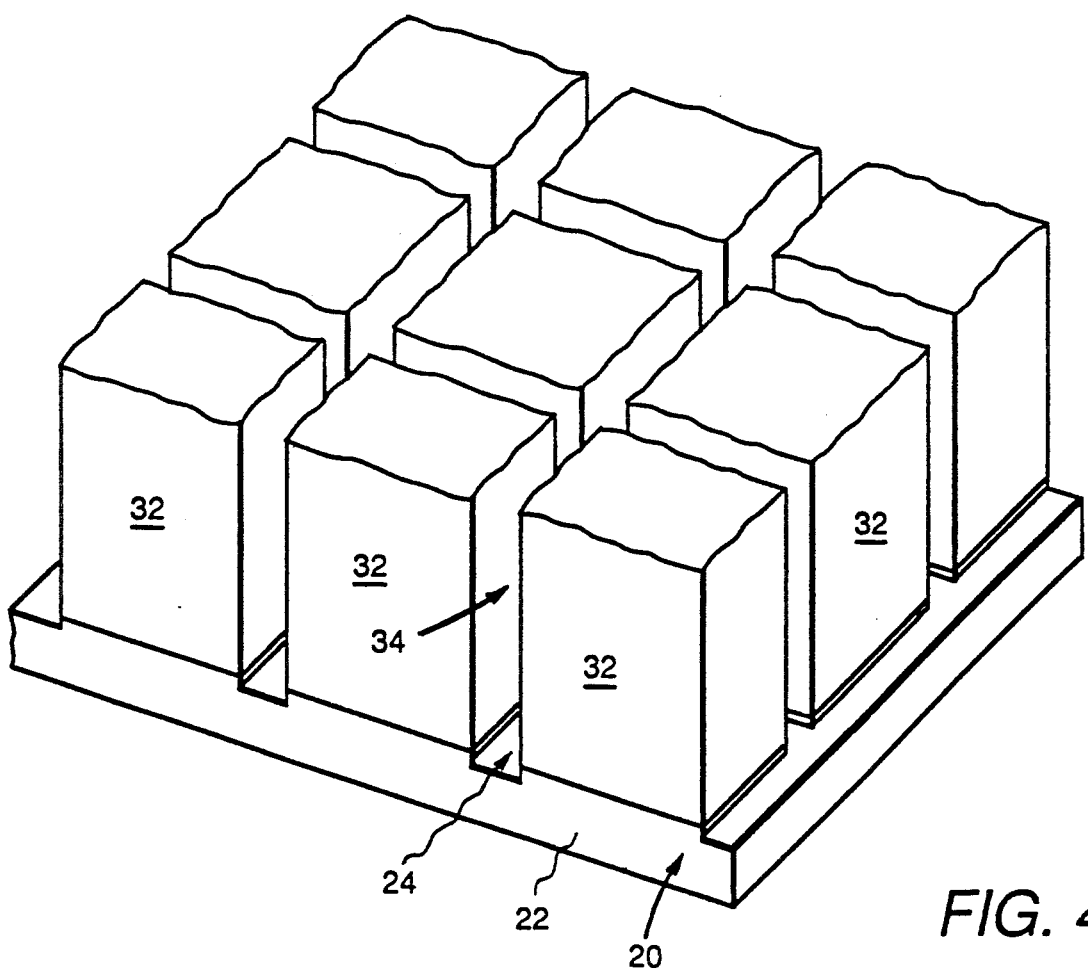
FIG. 4 is a detailed view of the structured scintillator array.
Figure 5:
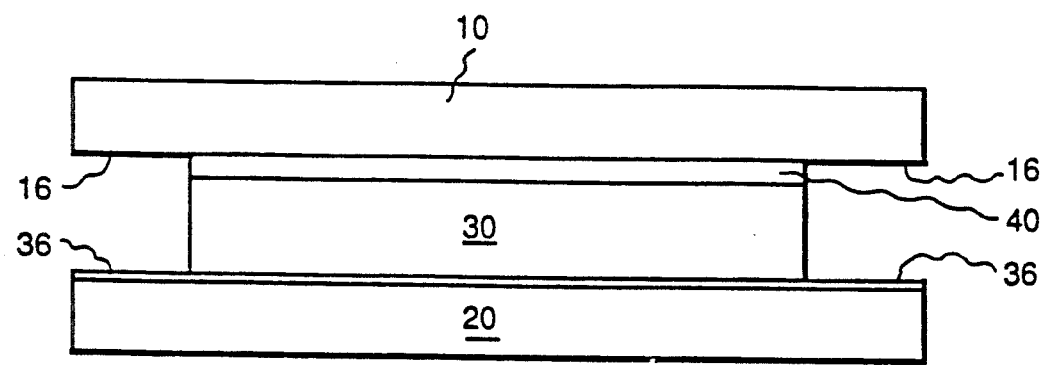
FIG. 5 illustrates the photosensitive array of FIG. 1 aligned with and bonded to the structured scintillator array of FIG. 2 to provide a high resolution x-ray imaging structure.

In accordance with the process taught in U.S. Pat. No. 4,011,454 to Lubowski et al. entitled "Structured X-Ray Phosphor Screen", a structured scintillator array may be grown on the upper face of support plate 20 by evaporation to provide a columnar scintillator array, a detailed view of which is presented in FIG. 4 where the individual scintillator elements 32 are restricted to the mesas and may have a height of from 150 to 450 microns or more. The mesas are preferably 70×70 microns square and spaced apart by grooves 30 microns wide for an imager with a 100 micron pitch. As an alternative to evaporation, sputtering or chemical vapor deposition may be employed in the growth of the scintillator elements.

Following growth of the structured scintillator material, the gaps 34 between the individual scintillator elements 32 are preferably filled in with a reflective material such as titanium dioxide, magnesium oxide or lead oxide powder in order to maximize the portion of the light which is generated within each element that is collected by its associated photosensitive cell. Gentle vibration of the scintillator structure can aid in settling this powder in the gaps between the adjacent scintillator columns.

We prefer to assemble the imager with the growth plate 20 remote from the photosensitive imaging array whereby the luminescence emerges from the non-initial growth end of the scintillator elements. To do this, it may be necessary to polish the top of the structured scintillator in preparation for this assembly operation. That surface is preferably coated with an initially fluid optical coupling medium 40 just prior to assembly of the photosensitive array and the scintillator array into the final x-ray imaging array. This fluid preferably then solidifies to form an adhesive which helps to hold the arrays in place. A silicone potting gel such as Sylgard ® available from Dow Corning is a suitable optical coupling material. The photosensitive array is then placed on top of the scintillator array and its lateral position adjusted while observing the registration marks 16 and 36 until the relationship between these registration marks indicates that the two arrays are accurately aligned. The relative positions of the two arrays are then fixed and the optical coupling medium is allowed to solidify. In this manner, the photosensitive array is disposed at the surface of the structured scintillator array which is remote from the growth plate 20.

Proper alignment of the scintillator array with respect to the photosensitive imaging array is crucial to providing a high quality, high resolution image with maximum sensitivity. This is for several reasons. First, if the arrays are assembled so that a given scintillator element overlaps more than one photosensitive cell, then the light from that scintillator element will be collected by two or more different photosensitive cells with a consequent reduction in resolution. Further, some of the light from that scintillator element will strike the photosensitive imaging array in between photosensitive cells and will not be collected. Thus, accurate alignment is considered crucial to maximum performance. It is for this reason that we prefer to have the growth plate alignment reference marks formed as an integral part of the process of forming the growth plate topographical pattern, since that ensures that they have a fixed, predetermined position with respect to the individual scintillator elements. It is for this same reason that we prefer to form the photosensitive imaging array with its alignment reference marks created as an integral part of the process of forming the photosensitive imaging array itself.

Figure 6:
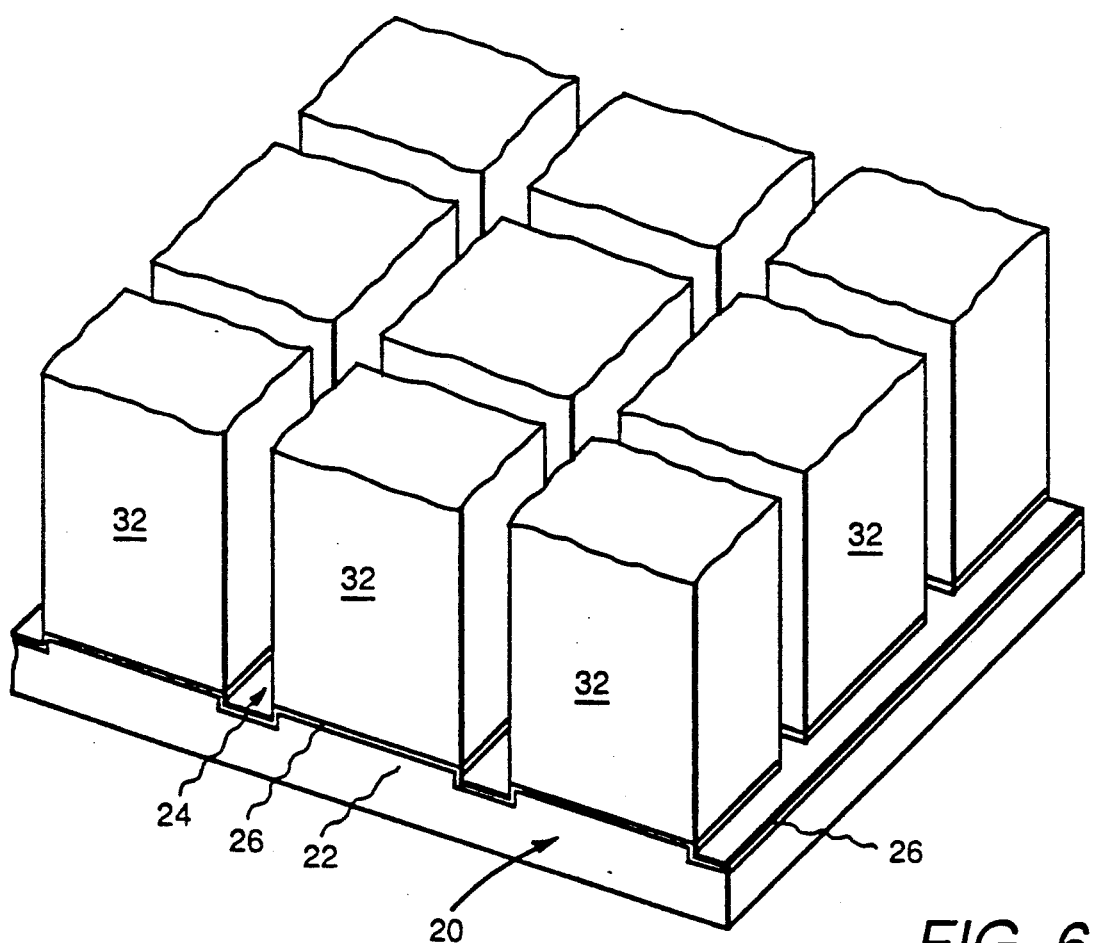
FIG. 6 illustrates a modified version of the FIG. 4 structure.

When the system is to be assembled in this manner, it is preferred to provide a growth plate 20 which is either inherently reflective or to coat it with a reflective layer 26, as shown in FIG. 6, prior to the initiation of growth so that it will reflect any light which strikes that surface back into the individual scintillator elements 32 toward their associated photosensitive cells at the opposite side of the scintillator array. Such a reflective surface may be provided by using a metallic growth plate or by coating a transparent growth plate with an appropriate reflective material such as a layer of metal prior to the beginning of the growth process. This x-ray imaging array requires only the low voltages needed to operate the photosensitive imaging array and is rugged and maintenance free.

When assembled with the growth plate away from the photosensitive imaging array, the imager itself is mounted for x-ray detection with the growth plate toward the x-ray source. Consequently, the growth plate should be sufficiently transparent to x-rays to avoid interfering with the x-ray imaging process. Quartz and aluminum are appropriate materials.

As an alternative to assembly of this x-ray imager with the growth plate remote from the photosensitive imaging array, the assembly may be done with the growth plate adjacent to the photosensitive imaging array. In that situation, the growth plate should be transparent to the luminescent light and sufficiently thin to minimize scattering and other transmission of the luminescent light from in alignment with one of the photosensitive cells of the photosensitive imaging array into alignment with a different one of the photosensitive cells of the array. A polyimide layer is an appropriate growth plate in that situation.

However, such assembly is not preferred because the support or growth plate will generally be thick enough to interfere with efficient transfer of luminescence from the scintillator to the photosensitive imaging array.

While it is preferred to have the same number of elements in the photosensitive imaging array and scintillator arrays, the photosensitive imaging array may be larger than the scintillator array and have more elements or vice versa.

As an alternative to growing the structured scintillator, it can be formed by sawing, laser ablation, chemical etching or other techniques.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method of forming an x-ray imaging array comprising:

providing a photosensitive imaging array including a plurality of photosensitive imaging cells arranged in a predetermined primary array pattern, said photosensitive imaging array including a first set of reference features having a predetermined positional relationship to said primary array pattern of said photosensitive imaging array;

forming an array of scintillator elements on a separate scintillator substrate, said scintillator elements being arranged in said predetermined primary array pattern, said scintillator array including a second set of reference features having a predetermined positional relationship to said primary array pattern of said scintillator array and which are complementary to said first set of reference features;

bringing said photosensitive imaging array and said scintillator array into close proximity;

applying an optical coupling medium between said imaging array and said scintillator array, said coupling medium being fluid during adjustment of the relative positions of said arrays to form a high integrity optical coupling between said arrays;

adjusting the relative positions of said arrays until the relationship of said first reference features to said second reference features indicates that said primary array pattern of said scintillator array and said primary array pattern of said photosensitive imaging array are properly disposed to be secured in alignment; and securing said photosensitive imaging array and said scintillator array to maintain said photosensitive imaging array and said scintillator array in an aligned condition.

2. The method recited in claim 1 wherein:
said first set of reference features are integral with said photosensitive imaging array.

3. The method recited in claim 2 wherein:
said first set of reference features are artifacts of the fabrication of said photosensitive imaging array.

4. The method recited in claim 1 wherein:
said second set of reference features are integral with a physical component of said scintillator array.

5. The method recited in claim 4 wherein:
said second set of reference features are integral with a physical component of said scintillator array which controlled the locations in which the individual scintillator elements are disposed.

6. The method recited in claim 1 wherein the step of forming an array of scintillator elements include the step of:
providing an optical reflecting surface on said scintillator substrate.

7. The method recited in claim 1 wherein:
there are the same number of photosensitive cells in said photosensitive imaging array as there are scintillator elements in said scintillator array.

8. The method recited in claim 1 wherein the step of forming comprises:
providing a topographically patterned surface whose topographic features include spaced apart, raised mesas, the pattern of the centers of said mesas being substantially the same as said primary array pattern; and growing a structured scintillator material on said patterned surface, with the locations of the elements of said structured scintillator determined by the topography of said surface.

9. The method recited in claim 8 wherein the step of growing comprises:
growing said scintillator elements on said topographical surface by evaporation, sputtering or chemical vapor deposition.

10. The method recited in claim 9 wherein:
the scintillator material is provided by evaporation of a body of scintillator source material having the composition desired for the scintillator material.

11. An x-ray imaging array comprising:
a photosensitive imaging array including a plurality of photosensitive imaging cells arranged in a predetermined primary array pattern, said photosensitive imaging array including reference features;

an array of scintillator elements disposed on a support plate and arranged in said predetermined primary array pattern, said scintillator array including reference features which are complementary to those present on said photosensitive imaging array; and a curable optical coupling medium disposed between said photosensitive imaging array and said array of scintillator elements to provide high integrity optical coupling between said arrays;

said photosensitive imaging array and said scintillator array being secured to each other with their respective reference features disposed in alignment.

12. The x-ray imaging array recited in claim 11 wherein:
said scintillator array includes an optically reflective layer at the end of said scintillator elements which is remote from said photosensitive imaging array.

* * * * *